July 4, 1939.  F. M. CLARK ET AL  2,165,090

RESINOUS COMPOSITIONS AND CAPACITORS CONTAINING THE SAME

Filed March 17, 1936

Inventors:
Frank M. Clark,
Ralph A. Ruscetta,
by Harry E. Dunham
Their Attorney.

Patented July 4, 1939

2,165,090

UNITED STATES PATENT OFFICE 2,165,090

RESINOUS COMPOSITIONS AND CAPACITORS CONTAINING THE SAME

Frank M. Clark and Ralph A. Ruscetta, Pittsfield, Mass., assignors to General Electric Company, a corporation of New York Application March 17, 1936, Serial No. 69,405

12 Claims. (Cl. 175—315)

The present invention comprises new resinous compositions suitable for use as electrolytes in capacitors, or other electrolytic devices, and a method of preparing such compositions.

It is the object of our invention to provide electrolytes of improved physical and chemical characteristics which in particular will have a high degree of stability in the elevated range of temperatures to which capacitors are exposed under working conditions. Electrolytes embodying our invention are of a semi-solid, balsamic or resinous consistency. They comprise as an essential ingredient a pyrogenous product derived from a mixture of suitable monobasic, saturated, hydroxy aliphatic acid and its ammonium salt. Such material when used as an electrolyte preferably is modified by the presence of an ionogen and a resistance-modifying agent, such as an amide.

Figure 1:
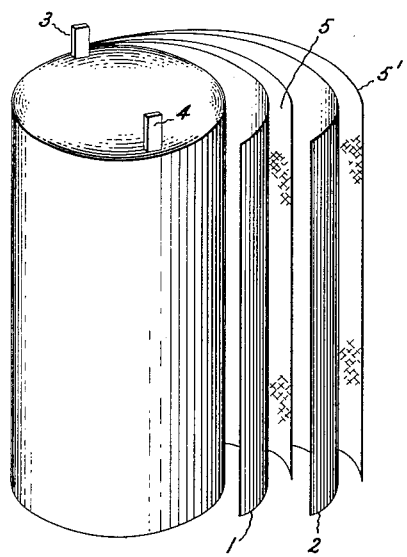
Figure 2:
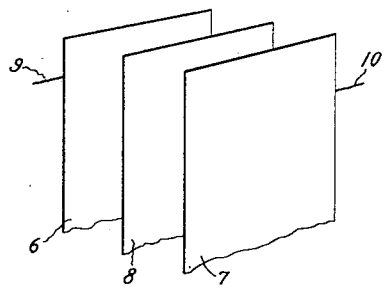

In the accompanying drawing Fig. 1 shows in perspective a roll type of electric capacitor (shown partly unrolled) and Fig. 2 diagrammatically indicates a stack type of capacitor.

The alpha, gamma and delta monobasic, saturated hydroxy aliphatic acids when heated lose water with the formation of anhydrides, commonly classified as lactides or lactones, depending on the nature of the parent material which is used. This type of product is known by chemists as an "inner ester", this term being used herein to designate a pyrogenous product derived by heating such acid to a temperature of at least about 120° C. for several hours. Illustrative of the type of materials which are included under the description hydroxy aliphatic acids are:

Glycollic acid or hydroxy acetic acid;
Lactic or alpha hydroxy propionic acid;
Gamma hydroxy butyric acid; and
Gamma oxy-valeric acid.

In the preparation of our electrolyte of high thermal stability we subject to pyrogenous decomposition a mixture of the aliphatic hydroxy acid and its ammonium salt as will be later illustrated. We believe that as a result of the pyrogenous decomposition we produce a mixture of the lactide or lactone type of compound (depending on the particular type of acid used) and the acid amide formed in accordance with known phenomena from the ammonium salt of the acid.

Of the possible pyrogenous products derived from a mixture of the hydroxy aliphatic acids and their ammonium salts, we prefer the product obtained from lactic acid (alpha hydroxy propionic acid) and ammonium lactate.

The following examples will further explain the novel features of our invention.

Example 1

A mixture consisting by weight of 64% lactic acid and 36% boric acid is caused to combine with ammonia, for example, by conducting ammonia into the mixture of acids until the product is a thin, clear liquid having a pH value of 4.9, a resistance at 25° C. of 200 ohms per centimeter cube. At 90° C. the resistance of the product is 9 ohms per centimeter cube. The boric acid is converted into ammonium borate which, as is well known, functions as an ionogen. The product is heated at about 120 to 130° C. for about four hours until a pyrogenous product is produced which is a waxy solid at 25° C., while being a clear liquid at 90° C. This pyrogenous product appears to consist in part at least of a lactamide even though the heat conversion is not necessarily carried so far that complete conversion to lactamide occurs. The term lactamide will be used herein to include also equivalent compositions which are obtained by the thermal breakdown of the ammonium salts of equivalent monobasic hydroxy aliphatic acids. The resistance of the lactamide at 90° C. is of the order of 6600 ohms per centimeter cube.

At 250° C. the resistance is too high for the use of the described lactamide composition in electrolytic capacitors, and hence it is modified for such use by a resistance-reducing agent. Formamide which is soluble in the composition is well suited to the purpose of reducing its resistivity. If by weight 25% of formamide and 75% of lactamide composition are compounded or mixed at 100° C. (with agitation to produce homogeneity), the resulting product is characterized by a pH value of about 5 and a resistance at 90° C. of 221 ohms/cm³ and at 25° C. of 23,200 ohms/cm³. As hereinafter indicated, other saturated aliphatic, monoprimary amides, such as acetamide may be used as resistance-reducing addition agents.

At 90° C. the product is a clear thin liquid and therefore is well adapted for the impregnation of the porous spaces of capacitor units, or for the surface coating of capacitor armatures to be used without spacers. At 25° C. the product is a clear, viscous or plastic, semi-solid material.

In the drawing is shown a typical roll type of capacitor (condenser) consisting of aluminum armatures 1, 2 and having terminals 3, 4 of the elongated strip type. Between adjacent turns of the armatures are porous spacers 5, 5' which are adapted to be impregnated with an electrolyte. In some cases the spacer may be omitted. When a spacer is desired it may consist of a fabric, such as cheesecloth, or of paper.

In the particular case illustrated, the spacer consists of paper, which may be .001" in thickness and be sufficiently absorbent to be capable of being impregnated by the electrolyte when the latter is heated to 90° C. to 100° C. or thereabouts. Although but one sheet of paper is shown between adjacent turns, two or three may be used. As used in Fig. 2, capacitor armatures 6, 7 may be stacked superposed, instead of rolled, preferably with one or more interposed spacers, one of which is indicated at 8. Terminals 9, 10 are applied to the terminal plates or armatures. The aluminum foil should be treated to form an oxygenous film thereon prior to assembling of the capacitor parts, preferably by electrolytic treatment as described in prior Clark and Koenig Patent No. 2,022,500, patented November 26, 1935.

The impregnation of a capacitor unit consisting of aluminum foil armatures with or without spacers therebetween when properly assembled may be carried out by immersing the unit in an electrolyte composition made as herein described while the latter is heated to a temperature at which it is thinly liquid, for example 100° C. Preferably gas under pressure of about 100 lbs. per square inch is applied to insure penetration of the electrolyte into the interstices of the unit. The impregnated capacitor may be cured in accordance with the usual methods, for example, by applying intermittent uni-directional voltage of alternating polarity followed by the application of intermittent alternating voltage of 110 volts, 60 cycles.

Capacitors thus fabricated have a power factor of approximately 7% at 25° C., the capacity being about one microfarad for nine square inches of active foil surface. When capacitors so fabricated are subjected to temperatures as high as 75° C. even for a period of several weeks, no deterioration occurs in the capacity characteristic and in fact an improvement may result.

Example 2

In some cases it is desirable to treat an electrolyte made as above described and containing 25% formamide with ammonia gas in order to produce a substantially neutral condition. For example, if the pyrogenous product is treated with ammonia gas until the pH value is about 6.8 to 7, the resulting product consists of a thin, clear liquid at 90° C. and solidifies to a clear yellow jelly at 25° C. The ammonia-treated product has a resistance at 90° C. of the order 125 to 150 ohms/cm$^3$ and at 25° C. of the order of 4000 ohms/cm$^3$. It will be observed that the treatment with ammonia reduces the resistance value. While the treatment with ammonia does not appreciably change the capacity characteristic of capacitor units impregnated with such product, the power factor is found to be reduced, being as low as 5% at 25° C. Subjection of units impregnated with this product to temperatures of 75° C. results in an improvement. In any event no deterioration results due to heating.

Example 3

In some cases it is desirable to mix the ingredients, namely, lactic acid, boric acid and formamide before being subjected to heat treatment. A mixture consisting by weight of 48% lactic acid, 27% boric acid and 25% formamide is treated with ammonia gas at a temperature of 75 to 80° C. until the pH value is of the order of 7.0 to 7.5. The product is heated at a temperature within the range of about 130° to 140° C. for approximately 3 to 4 hours, or until the resistance of the pyrogenous product has reached a value of about 137 ohms/cm$^3$ at 90° C. The pyrogenous product is characterized in general by the properties already described in connection with the foregoing examples.

Example 4

In some instances the individual reagents may be prepared separately and then mixed thoroughly to obtain the desired electrolyte. For example, lactic acid may be treated with ammonia thereby forming ammonium lactate which then is heated to form a semi-solid lactamide-containing product. This pyrogenous composition is admixed with ammonium borate crystals and formamide in the proportions above indicated. The resulting product is heated to a temperature at which it is liquid and impregnation is carried out as above described.

While the proportions given in connection with the above examples are to be considered illustrative only, in general it is preferred that the amide which may consist of formamide, or a combination of amides such as acetamide and formamide, should not constitute more than 40% by weight of the total mixture. It is also preferred in general that the lactic acid component of the final product should be at least as great as the amide component. In place of lactic acid, other aliphatic hydroxy acids may be used, such as heretofore indicated.

In place of the ammonium borate salts of other oxygen-containing acids may be used as ionogens, as, for example, the ammonium or alkali salts (sodium or potassium salts) of phosphoric acid, tartaric acid, acetic acid or citric acid.

Wherever in the accompanying claims specific reference is made to formamide, it is to be understood that equivalent amides, as, for example, acetamide, are included in the scope of such claims.

What we claim as new and desire to secure by Letters Patent of the United States is:

1. A resinous product derived by the heat treatment of a mixture of lactic acid and ammonium lactate, said product being a waxy solid at 25° C. and a clear liquid at 90° C.

2. A viscous, semi-solid impregnating composition for electrolytic capacitors having film-forming electrodes, said impregnant including ammonium borate, a waxy solid product derived by heat treatment of ammoniated lactic acid, constituting a major ingredient and formamide, constituting a minor ingredient, said composition being liquid at 90° C.

3. The process of preparing a composition adapted for impregnating capacitors which consists in combining ammonia with a mixture comprising a major proportion of lactic acid and a minor proportion of boric acid to form a liquid product, heating said product to a temperature of about 120 to 130° C. for several hours, and compounding the resulting product with a saturated, aliphatic, monoprimary amide.

4. The process of preparing an electrolyte composition which consists in forming a mixture of about 64 per cent lactic acid and 36 per cent boric acid, conducting ammonia into said mixture to form the corresponding ammonium compounds from said acids, heating the resulting product at about 120 to 130° C. for about four hours, adding about 25 parts of formamide to 75 parts of said product, and compounding said ingredients at 100° C. to form a homogeneous product.

5. A composition suitable for use in electrolytic devices, such as capacitors, comprising the combination of an ionogen, a resistance-reducing material and an inner ester derived by heating to a temperature of at least about 120° C. a mixture of an acid of the group consisting of alpha, gamma and delta monobasic, saturated hydroxy aliphatic acid and ammonium salt of an acid of said group.

6. The combination of film-forming electrodes and a composition comprising the combination of an ionogen, formamide and a product derived by heating to a temperature of at least about 120° C. a mixture of an acid of said group consisting of alpha, gamma and delta monobasic, saturated hydroxy aliphatic acid and ammonium salt of an acid of said group.

7. A composition comprising in combination a waxy product derived by heating ammoniated lactic acid to about 120 to 130° C., an ionogen, and a resistance-reducing material.

8. A composition comprising a mixture of a waxy product derived by heating lactic acid to at least about 120° C., an ionogen, and formamide in a quantity sufficient to appreciably modify the electric resistivity of said mixture.

9. A semi-solid balsamic material for use with film-forming electrodes comprising the combination of an ionogen, saturated, monoprimary organic amide and a waxy product derived by heating an ammoniated compound of lactic acid.

10. A resinous product derived by the prolonged heat treatment at about 120 to 140° C. of an acid of the group consisting of the alpha, gamma and delta monobasic, saturated hydroxy aliphatic acids and an ammonium salt of an acid of such group.

11. An electric capacitor containing film-forming armatures and an electrolyte comprising the combintion of an ionogen, formamide and a product derived by heating to a temperature of about 120° to 140° C. for several hours an ammoniated acid of the group consisting of alpha, gamma and delta monobasic, saturated hydroxy aliphatic acid.

12. A composition of matter comprising the combination of an ionogen, a saturated, monoprimary organic amide, and an inner ester derived by heating to a temperature of about 120 to 140° C., an ammoniated, saturated hydroxy aliphatic acid.

FRANK M. CLARK.
RALPH A. RUSCETTA.